Feb. 1, 1966            O. M. YORK            3,232,367

COLLAPSIBLE POWER DRIVE GOLF BAG CART

Filed Sept. 10, 1963

INVENTOR.
OMER M. YORK
BY *Elliott & Pastoriza*
ATTORNEYS

United States Patent Office
3,232,367
Patented Feb. 1, 1966

3,232,367
COLLAPSIBLE POWER DRIVE GOLF BAG CART
Omer M. York, 8051 Kelvin Ave., Canoga Park, Calif.
Filed Sept. 10, 1963, Ser. No. 307,977
4 Claims. (Cl. 180—19)

This invention relates to carts and more particularly to an improved collapsible power driven golf bag cart.

Golf carts as substitutes for caddies have become highly popular on golf courses. Usually golf carts of the more simple variety comprise a frame for supporting a golf bag mounted on a two wheel structure. An elongated handle extends from the upper end of the frame so that a golfer may pull or push the cart along with him as he traverses the course. More sophisticated golf carts may include power means such as an electric or gasoline motor as well as a seat for the golfer so that he may drive the cart between the various holes.

Golf carts of the type which will carry the golfer cannot readily be transported from a golfer's home to the course and thus are usually retained at a golf club for use of golfers. The very simple types of golf carts which must be manually pulled or pushed around the course can be kept by the golfer along with his golf bag but there is still the problem of the golfer having to pull the cart. Where small up-grades are encountered, the golfer must pull both the weight of the bag and the weight of the cart.

It has been proposed accordingly to provide power driven carts which are sufficiently small that a golfer may economically own the cart. With such carts, however, there is still the problem of carrying the cart to and from the course because of its relative bulkiness. Further, in transporting motorized carts of the gasoline driven variety, unless the cart is retained in an upright position when carried in an automobile, gasoline may spill from the engine.

With the foregoing considerations in mind, it is accordingly a primary object of this invention to provide a greatly improved collapsible type power driven golf bag cart which will serve to transport a golfer's bag about the course with its own power and yet which may be very easily transported between the golfer's home and the golf course.

More particularly, objects of the invention are to provide a power driven golf cart which is relatively light, easy to operate, and which may be collapsed to a compact condition to facilitate transporting the cart.

Another important object is to provide a motorized golf cart in which gasoline spillage and the like when the same is being transported between a golf course and a golfer's home may readily be avoided.

Briefly, these and many other objects and advantages of this invention are attained by providing a golf cart in the form of an elongated frame member for holding the golfer's bag. A pair of wheels in turn are collapsibly supported to this frame member by unique collapsing means which enables the wheels to be moved towards each other and still be retained in an upright position. The frame means itself serves to support a motor such as a gasoline motor, this motor being connected to the wheels through unique shaft means. In the preferred embodiment, the shaft means take the form of flexible shafts which will simply bow when the wheels are collapsed towards each other. The frame means also supports a small swivel type tail wheel, to provide a tricycle support. A further feature of the invention includes a removable or separable type gasoline tank so that the power cart may be carried independently of the gasoline tank and when ready to use on the course, the gasoline tank may simply be inserted in a convenient pocket secured to the motor and the gas line connected. By this arrangement, spillage of gasoline during transporting of the cart is wholly avoided.

A better understanding of the invention will be had by now referring to a preferred embodiment thereof as illustrated in the accompanying drawings, in which.

Figure 1:
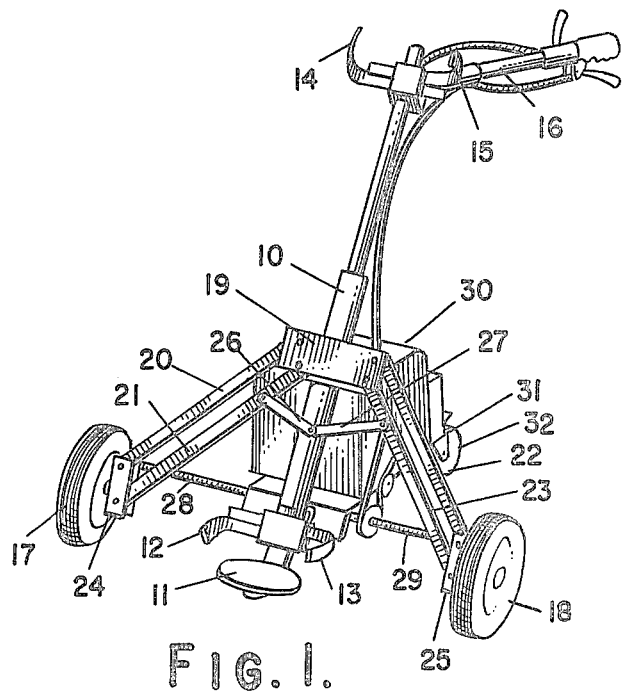
FIGURE 1 is a perspective view of the collapsible power driven golf bag cart of this invention.

Referring first to FIGURE 1, the golf cart comprises an elongated frame means 10 terminating at its lower end in a small circular pedestal 11 adapted to cooperate with clips 12 and 13 for holding the lower end of a golf bag. The upper end of the frame means 10 similarly terminates in clips 14 and 15 for retaining the upper end of the golf bag. An elongated handle 16 extends rearwardly from the upper end of the frame means 10 as shown.

The frame is supported by a pair of main wheels 17 and 18 connected by a collapsing means to a center slide plate 19 arranged to move up and down on the elongated frame member 10. The parallel collapsing means preferably take the form of a first pair of parallel bars 20 and 21 individually pivoted at first ends to the movable plate 19 and at second ends to the wheel 17, and a second pair of parallel bars 22 and 23 similarly pivoted at first ends to the plate 19 and at second ends to the other wheel 18. The wheels 17 and 18 incorporate suitable frame plates 24 and 25 respectively for effecting the pivoted connections to the lower ends of the pairs of bars 20, 21 and 22, 23. The bars themselves are of equal length and disposed in parallel relationship so that they will maintain the orientation of the respective wheel substantially in a vertical plane or in an upright position when the wheel are moved towards each other.

As shown in FIGURE 1, the pairs of bars generally define an inverted V with the apex of the V coinciding with the movable plate 19. Suitable links such as indicated at 26 and 27 are pivoted to the bars 21 and 23, respectively, and to the central elongated frame member 10. The wheels themselves are power driven through flexible shafts 28 and 29 connected to a motor 30 mounted on a rear frame plate 31 constituting an extension of the frame means 10. This same plate 31 serves to support a tail wheel 32 which is mounted for swivelling action to provide a tricycle support for the cart.

Figure 2:
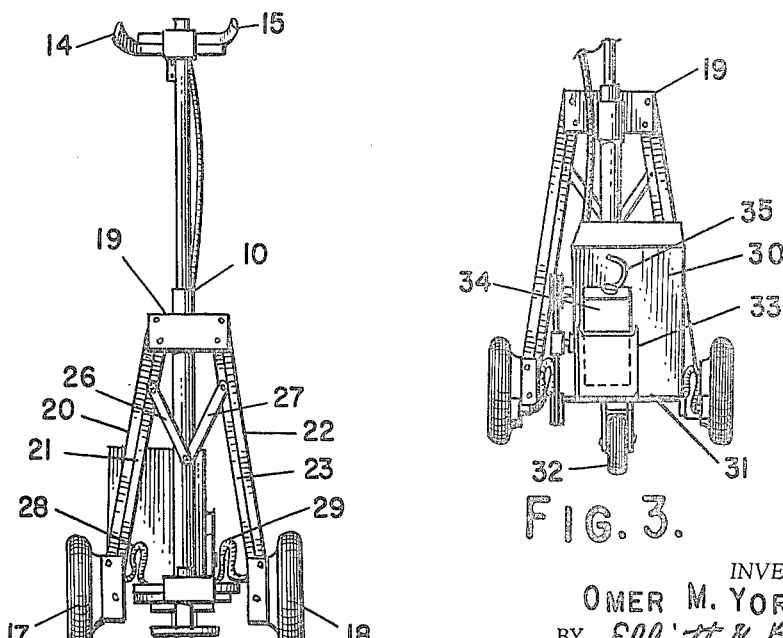
FIGURE 2 is a front elevational view thereof when in collapsed position.

With particular reference to FIGURE 2, it will be evident that in order to collapse the cart, the plate 19 may simply be slid upwardly along the elongated frame 10. When this movement is effected, the pairs of rods 20, 21 and 22, 23 will necessarily pull inwardly on the wheels 17 and 18, the links 26 and 27 effecting a symmetrical inward movement of both of the wheels 17 and 18 towards each other. Because of the use of pairs of parallel bars of equal length pivoted as described, the wheels will retain their orientation or upright position when they are collapsed together. This feature is desirable in that the cart may still be rolled on a flat surface when in the collapsed position.

In accordance with a further important feature of this invention, the provision of the flexible shafts described at 28 and 29 in FIGURE 1 enables collapsing of the wheels to be effected without the necessity of disconnecting the shaft running from the motor to the wheels. As shown in FIGURE 2, the shafts 28 and 29 simply bow when collapsing of the wheels is effected.

Figure 3:
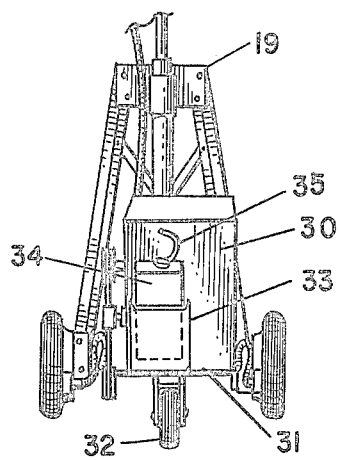
FIGURE 3 is a fragmentary rear elevational view thereof illustrating further features of the invention.

Referring now to the rear fragmentary view of FIGURE 3, it will be noted that the motor 30 includes a rear pocket or cavity 33. This cavity 33 is arranged to receive a separable gas tank 34 as shown. The gas tank 34 is connected to feed gas to the motor 30 by a small flexible fuel line 35 which is detachable with respect to the can 34.

The operation of the golf cart will be evident from the foregoing description. Initially, the cart may be collapsed as illustrated in FIGURE 2 and the can of gasoline 34 disconnected from the hose fuel line 35 and carried separately in a golfer's automobile. Without the gas tank within the pocket 33, the golfer may place the entire cart in his car trunk or on its side in any convenient position without fear of gasoline spilling over the interior of the car.

When the golfer arrives at the course, he may easily remove the cart and by pushing downwardly on the slide plate 19, cause the wheels 17 and 18 to expand to their normal wide apart position to provide a stable base for the cart. The extent of expansion will be determined by the lengths of the flexible shafts 28 and 29. It is preferable to expand the wheels sufficiently so that the flexible shafts 28 and 29 assume a straight line position.

The golfer may then place the can of gasoline in the pocket 33 and connect the outlet fuel line hose 35 to a suitable outlet in the top of the can 34. In this respect, there may be provided an auxiliary cap having a small nipple thereon which may be substituted for the conventional can cap when the can is to be positioned in the pocket and used to supply gasoline to the motor 30.

With the cart assembled, the golfer may then place his bag on the pedestal 11 and clip it within the lower and upper clips 12, 13 and 14, 15, in the usual manner.

After the engine 30 is started, the golfer may then employ conventional type hand operated clutch and throttle controls adjacent to the far end of the handle 16 for operating the cart. In this respect, the wheels 17 and 18 preferably include one way clutch structures so that the cart may be rolled or moved in a direction with the golfer behind the cart as opposed to the usual direction when the golfer pulls the cart. In other words, it is a simple matter to push the cart without turning over the engine should the engine not be operated. However, rearward movement will cause a gripping of the clutch structures to take place so that the cart will be retained on a slope if headed in an upward direction when not operating.

When the golfer has finished using the cart, he may remove the golf bag and then slide the plate 19 upwardly to collapse the wheels 17 and 18 together.

The gas tank 34 may then be disconnected from the hose 35 and the conventional cap replaced on the can in lieu of the special cap provided. The golfer will then store the golf cart in his automobile or any other suitable storage place preparatory to subsequent use.

From the foregoing description, it will be evident that the present invention has provided a greatly improved golf cart. Not only is the cart relatively light and economical to operate, but even in its collapsed position, it may be easily rolled about a flat surface. Moreover, the collapsing of the legs together results in a relatively compact configuration so that the cart may be easily transported in a golfer's automobile.

While only one particular embodiment of the invention has been set forth and described, various modifications falling within the scope and spirit of this invention will occur to those skilled in the art. The collapsible power driven golf bag cart is therefore not to be thought of as limited to the one embodiment set forth merely for illustrative purposes.

What is claimed is:

1. A collapsible power driven golf bag cart comprising, in combination: a frame structure including an elongated upwardly extending frame member, said frame member including means adjacent to its lower and upper ends for securing a golf bag; a slide plate coupled to said frame member for up and down movement along an intermediate portion thereof; a pair of wheels; a motor secured to said frame structure adjacent to said frame member; flexible drive shafts extending from said wheels to said motor; a first connecting means pivoted at its opposite ends to said slide plate and one of said wheels respectively; and a second connecting means pivoted at its opposite ends to said slide plate and the other of said wheels respectively so that said first and second connecting means define generally the arms of an inverted V with said slide plate positioned at the apex of said V; and first and second links forming an upright V with the apex of said links pivoted to said frame member and the upward diverging ends of said links pivoted respectively to said first and second connecting means, whereby upward sliding movement of said slide plate along said frame member causes said wheels to move towards each other through the medium of said links to collapse said cart, said flexible shafts bowing to accommodate said movement.

2. A cart according to claim 1, in which each of said first and second connecting means comprises a pair of bars of equal length parallel to each other and individually pivoted to said plate and corresponding wheel whereby the orientation of said wheels in a vertical plane remains substantially the same when said wheels are collapsed.

3. A cart according to claim 1, including a swivel mounted tail wheel secured to said frame structure in a position to the rear of said pair of wheels to define therewith a tricycle support for said golf cart.

4. A cart according to claim 1, in which said motor is a gasoline engine and includes a separable gas tank therefrom whereby said gas tank may be removed when said cart is collapsed for storage.

References Cited by the Examiner

UNITED STATES PATENTS

| 1,126,052 | 1/1915 | McGloughlin | 180—1 |
| 2,658,771 | 11/1953 | Rutledge et al. | |
| 2,812,824 | 11/1957 | Adams. | |
| 2,937,706 | 5/1960 | Chandler. | |
| 3,167,146 | 1/1965 | Rudolph. | |

BENJAMIN HERSH, *Primary Examiner.*

A. HARRY LEVY, *Examiner.*